UNITED STATES PATENT OFFICE.

VICTOR G. BLOEDE, OF BROOKLYN, NEW YORK.

IMPROVED COMPOUND FOR REMOVING INK, STAINS, &c.

Specification forming part of Letters Patent No. 87,088, dated February 23, 1869.

*To all whom it may concern:*

Be it known that I, VICTOR G. BLOEDE, of the city of Brooklyn, county of Kings, and State of New York, have invented a new Compound and Device for Removing Ink, Iron-Rust, Fruit, and other Stains from the hands and clothes; and I do hereby declare that the following is a full and exact description thereof.

The nature of my invention consists in so mixing or combining the acids (any of them) having an affinity for the salts or compounds of iron that, by compression or simple spontaneous desiccation, they shall assume a pencil, crayon, or other convenient form for carrying in the pocket. This is quickly accomplished, for instance, by the mixture of the finely-powdered vegetable acids with a certain proportion of glue, dextrine, isinglass, or other gummy matter, then molding this mixture into sticks or pencils, and allowing these to become thoroughly dry at a temperature not exceeding 90° Fahrenheit.

To enable others skilled in the art to make use of my invention, I will proceed to describe the processes employed by me, which give the most satisfactory results.

To produce these "chemical ink-erasers" in crayon form, for public or other school use, so that they are entirely harmless and devoid of all noxious compounds, I proceed as follows:

As a base, I employ citric or tartaric acid, or both combined, and make a saturated solution of them in boiling water. To this solution I add from two to five per cent. of glacial acetic acid and the same quantity of concentrated, chemically pure, hydrochloric acid. The solution is now brought to rapid boiling in a large porcelain evaporating-dish, and, under constant and violent stirring, the mixture is boiled nearly to dryness—*i. e.*, until it assumes a pasty or doughy consistence. When this result has been attained, a sufficient quantity (ten to twenty-five per cent. by weight) of thick gum-arabic, or other mucilaginous solution, is added, and the ebullition continued in a water-bath until the mass has obtained the proper consistence. It is then removed from the heat, and, some pleasant perfume or scent being stirred into it, it is poured or pressed into the molds desired, or rolled into sticks on a slab of marble.

The object of the acetic and hydrochloric acid is to heighten the erasive power of the substance. They have a peculiar further action, however, of breaking up or preventing crystallization. By these means the crystals of the acid are so broken up that they are reduced to a powder as fine as potato-starch.

For office or photographers' use, oxalic acid may be substituted for the others, as its action is somewhat more powerful.

The sticks, prepared as above described, in the course of a week or two become as hard and tough, especially if glue be substituted for the gum, as soap-stone or slate, thus, in whatever form it be, making a most neat, elegant, efficient, and handy pocket article, which cannot rub off or stain the clothes in any manner.

The damp condensed acids may be pressed into a brittle cake or pencil by merely applying a powerful pressure; or the vegetable acids may be finely powdered, and, being mixed with a gummy or mucilaginous solution, they can be pressed or molded into the required shape without further preparation; but the resulting pencil or crayon is very much inferior to those made as before described. Or the acids may be united by the application of heat and pressure alone. The result, however, is very inferior to the foregoing.

To use the crayons, proceed simply as follows: Wet or dampen the stain (either on the hands or clothes) with water, and apply the pencil or crayon, rubbing the substance well upon the stain, which will rapidly and completely disappear.

Instead of using water, the stains may be moistened by the tongue.

I do not claim the use of acids for removing the stains of ink or other salts of iron; but What I do claim as my invention, and desire to secure by Letters Patent, is—

1. An improved and more rapid solvent, obtained as above directed.
2. The compression or solidification of substances having affinity for stains into crayon or pencil shape, or other convenient pocket form, either by the use of gum, heat, pressure, or all combined, so that they form a hard, tough, soluble mass.

3. The surrounding of such solid crayon or pencil-erasers by wood, metal, or pasteboard, to make them more convenient to carry in the pocket, substantially in the manner and for the purpose herein set forth.

VICTOR G. BLOEDE.

Witnesses:
    JULIUS SOLGER,
    HENRY ERNI.